(12) United States Patent
Ichikawa et al.

(10) Patent No.: US 10,414,685 B2
(45) Date of Patent: Sep. 17, 2019

(54) SUBSTRATE PROCESSING METHOD

(71) Applicant: Via Mechanics, Ltd., Kanagawa (JP)

(72) Inventors: Kenichi Ichikawa, Kanagawa (JP);
Kaori Tateishi, Kanagawa (JP);
Yasushi Ito, Kanagawa (JP)

(73) Assignee: VIA MECHANICS, LTD., Kanagawa (JP)

( * ) Notice: Subject to any disclaimer, the term of this patent is extended or adjusted under 35 U.S.C. 154(b) by 212 days.

(21) Appl. No.: 15/793,754

(22) Filed: Oct. 25, 2017

(65) Prior Publication Data
US 2018/0134607 A1 May 17, 2018

(30) Foreign Application Priority Data

Nov. 15, 2016 (JP) .................................. 2016-221994
Sep. 7, 2017 (JP) .................................. 2017-171782

(51) Int. Cl.
| | | |
|---|---|---|
| *G01B 11/26* | (2006.01) | |
| *C03B 33/10* | (2006.01) | |
| *B25H 7/04* | (2006.01) | |
| *B23K 26/00* | (2014.01) | |
| *B23K 26/035* | (2014.01) | |
| *B23K 26/352* | (2014.01) | |
| *B23K 26/402* | (2014.01) | |
| *B23K 26/382* | (2014.01) | |
| *C03C 17/32* | (2006.01) | |

(Continued)

(52) U.S. Cl.
CPC ........ *C03B 33/102* (2013.01); *B23K 26/0006* (2013.01); *B23K 26/035* (2015.10); *B23K 26/352* (2015.10); *B23K 26/389* (2015.10); *B23K 26/402* (2013.01); *B25H 7/04* (2013.01); *C03C 17/32* (2013.01); *B23K 2103/172* (2018.08); *B23K 2103/54* (2018.08); *C03B 33/037* (2013.01); *C03B 33/074* (2013.01); *C03C 19/00* (2013.01); *C03C 2218/328* (2013.01)

(58) Field of Classification Search
CPC .................................................. C03B 33/102
USPC .................................................. 33/613, 645
See application file for complete search history.

(56) References Cited

U.S. PATENT DOCUMENTS

| 7,777,898 B2 * | 8/2010 | Matsumura ............ B23Q 17/22 356/614 |
| 2002/0104231 A1 * | 8/2002 | Tominaga ........... G03F 7/70775 33/706 |

(Continued)

FOREIGN PATENT DOCUMENTS

JP 2007007776 A 1/2007

*Primary Examiner* — George B Bennett
(74) *Attorney, Agent, or Firm* — Nixon Peabody LLP; Thomas P. Pavelko

(57) ABSTRACT

In a substrate processing method in which, for a substrate including a first layer made of a glass substrate and second layers made of a material different from that of the first layer and provided on a front surface and a back surface of the first layer, respectively, an intended mark is formed in each of the second layers, the substrate processing method includes the step of irradiating with a laser beam having an energy density capable of processing the second layers but incapable of processing the first layer from one surface side of the substrate, thereby simultaneously forming the mark at corresponding positions on each of a front surface and a back surface of the substrate.

4 Claims, 4 Drawing Sheets

(51) Int. Cl.
   *C03C 19/00* (2006.01)
   *B23K 103/00* (2006.01)
   *C03B 33/037* (2006.01)
   *C03B 33/07* (2006.01)
   *B23K 103/16* (2006.01)

(56) References Cited

U.S. PATENT DOCUMENTS

| | | | |
|---|---|---|---|
| 2004/0261282 A1* | 12/2004 | Bae | G03F 7/7085 |
| | | | 33/645 |
| 2009/0111062 A1* | 4/2009 | Kato | G03F 7/095 |
| | | | 430/325 |
| 2011/0002140 A1* | 1/2011 | Tsukahara | G02B 5/0236 |
| | | | 362/602 |
| 2015/0253136 A1* | 9/2015 | Jensen | G01C 9/00 |
| | | | 33/290 |
| 2016/0008927 A1* | 1/2016 | Grundmueller | B23K 26/57 |
| | | | 65/112 |
| 2016/0041359 A1* | 2/2016 | Gaskin | G01B 11/272 |
| | | | 250/573 |
| 2018/0080228 A1* | 3/2018 | Izumi | E04D 1/18 |

* cited by examiner

SUBSTRATE PROCESSING METHOD

CROSS-REFERENCE TO RELATED APPLICATION

The present application claims priority from Japanese Patent Applications No. 2016-221994 filed on Nov. 15, 2016 and No. 2017-171782 filed on Sep. 7, 2017, the contents of which are hereby incorporated by reference into this application.

TECHNICAL FIELD OF THE INVENTION

The present invention relates to a substrate processing method of forming an intended mark on each of front and back surfaces of a substrate having a glass substrate as a constituent material.

BACKGROUND OF THE INVENTION

In some cases, a mark such as an alignment mark to be used for positioning in processing a substrate such as a glass substrate is desired to be formed in a resin layer which is composed of a resin sheet attached on each of front and back surfaces of the substrate. Meanwhile, as a method of forming an alignment mark on a substrate, a method performed by machining means such as a drill disclosed in Japanese Patent Application Laid-Open Publication No. 2007-7776 (Patent Document 1) has been conventionally known. When the alignment mark is formed in the resin layer of the substrate according to this method, a crack is caused in the glass substrate at the position where the alignment mark is formed.

SUMMARY OF THE INVENTION

In this regard, an object of the present invention is to prevent occurrence of a crack in a glass substrate in forming an intended mark on each of front and back surfaces of a substrate having a glass substrate as a constituent material.

In a typical one of substrate processing methods disclosed in the present application in which, for a substrate including a first layer made of a glass substrate and second layers made of a material different from that of the first layer and provided on a front surface and a back surface of the first layer, respectively, an intended mark is formed in each of the second layers, the substrate processing method includes the step of irradiating with a laser beam having an energy density capable of processing the second layers but incapable of processing the first layer from one surface side of the substrate, thereby simultaneously forming the mark at corresponding positions on each of a front surface and a back surface of the substrate.

According to the present invention, it is possible to prevent occurrence of a crack in a glass substrate in forming an intended mark on each of front and back surfaces of a substrate having the glass substrate as a constituent material and to simultaneously form an intended pattern on each of the front and back surfaces.

BRIEF DESCRIPTIONS OF THE DRAWINGS

DESCRIPTIONS OF THE PREFERRED EMBODIMENTS

Embodiments

Figure 1:
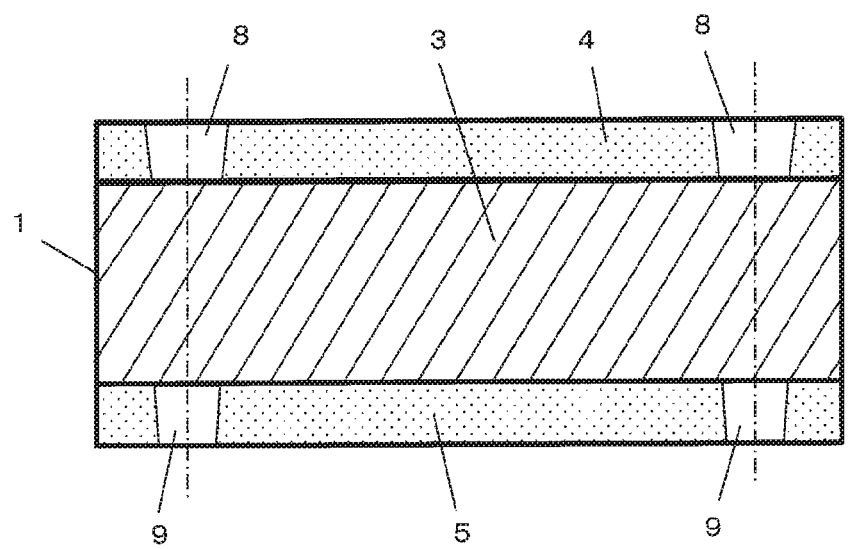
FIG. 1 is a cross-sectional view illustrating a state after a workpiece is processed according to a first embodiment of the present invention.

Hereinafter, embodiments of the present invention will be described with reference to the drawings.

First, a first embodiment in which an alignment mark is formed in a resin layer provided on each of front and back surfaces of a glass substrate by use of a laser beam will be described. Note that the same portions are denoted by the same reference characters throughout the drawings below.

Figure 2A:
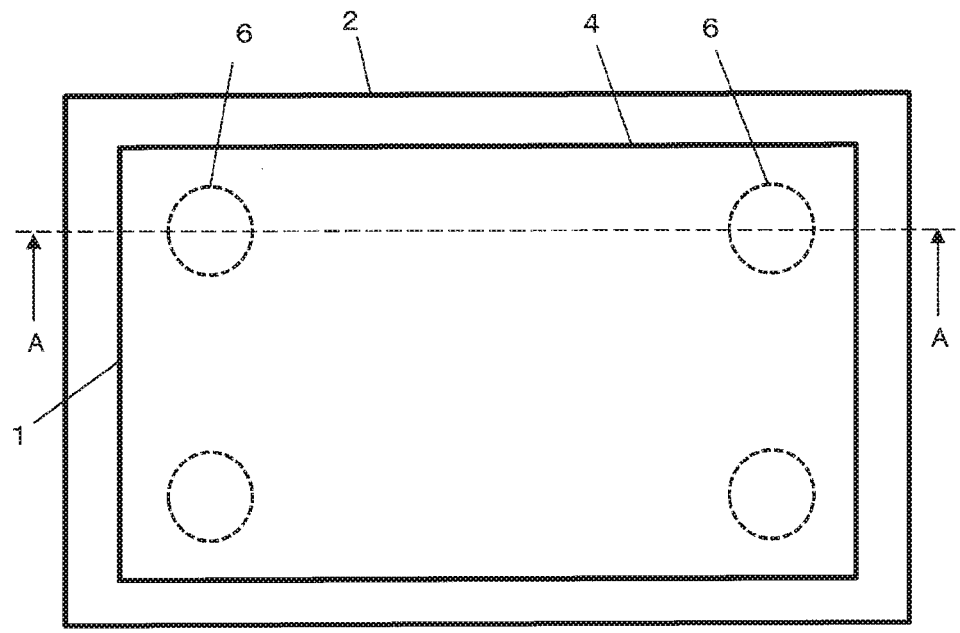
FIG. 2A is a plan view of the workpiece before the workpiece is processed according to the first embodiment of the present invention.
Figure 2B:
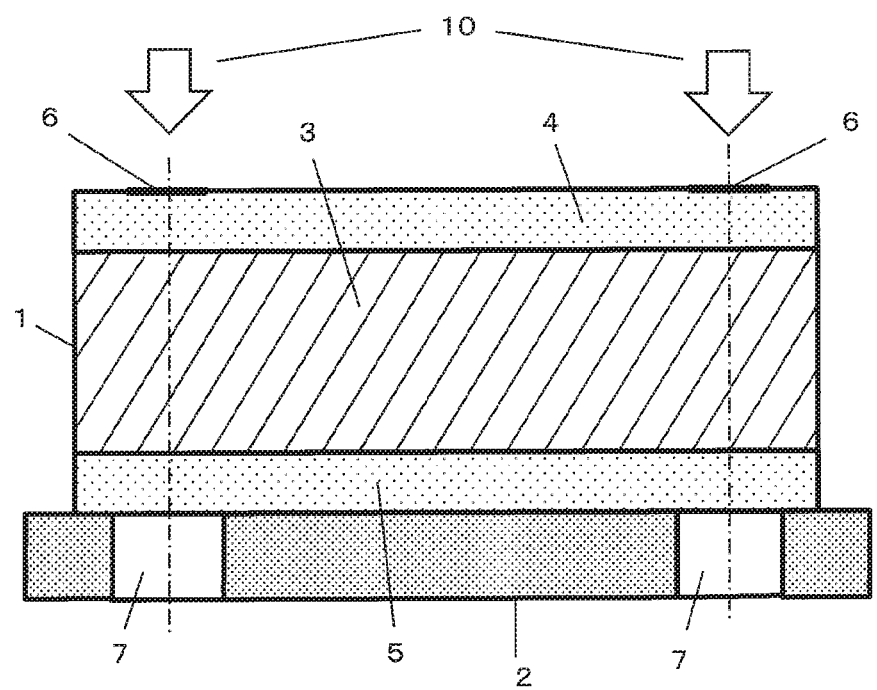
FIG. 2B is a cross-sectional view taken along a line A-A of FIG. 2A.

FIGS. 2A and 2B are views for describing the first embodiment of the present invention. FIG. 2A is a plan view of a workpiece before the workpiece is processed, and FIG. 2B is a cross-sectional view taken along a line A-A of FIG. 2A. In FIGS. 2A and 2B, reference numeral 1 is a substrate serving as a workpiece, reference numeral 2 is a table for placing the substrate 1, reference numeral 3 is a glass substrate serving as a constituent material of the substrate 1, reference numeral 4 is a resin sheet attached to a front surface of the glass substrate 3, and reference numeral 5 is a resin sheet attached to a back surface of the glass substrate 3. In this case, the resin layer may be provided by another method such as coating, instead of attaching the resin sheets 4 and 5. Reference numeral 6 denotes a circular alignment mark forming position to be formed on the resin sheet 4. A laser hole 7 having a diameter larger than that of the alignment mark to be formed is provided at a position in the table 2 corresponding to the alignment mark forming position 6, in order to prevent irradiation of the laser beam on the table 2.

In a state in FIGS. 2A and 2B, as indicated by arrows 10, each alignment mark forming position 6 on the resin sheet 4 is sequentially irradiated with a UV laser beam from top. This UV laser beam has an energy density of, for example, 20 mJ/mm$^2$, which is an energy capable of processing a resin but incapable of processing a glass.

The UV laser beam passing through the resin sheet 4 on the front surface passes through the glass substrate 3 without damaging the glass substrate 3 and reaches the resin sheet 5 on the back surface. Accordingly, after this processing, as illustrated in the cross-sectional view of the substrate 1 in FIG. 1, the substrate 1 in which respective portions of the resin sheets 4 and 5 at the alignment mark forming positions 6 are removed and circular alignment marks 8 and 9 are formed is completed.

In this case, even if a diameter of the alignment mark 9 on a side of the resin sheet 5 is a little smaller than a diameter of the alignment mark 8 on a side of the resin sheet 4 due to laser processing characteristics, there is no inconvenience as an alignment mark because a center of the alignment mark 8 and a center of the alignment mark 9 are located at corresponding positions in a vertical direction.

According to the first embodiment described above, it is possible to simultaneously form the alignment marks 8 and 9 in the resin sheets 4 and 5, respectively, such that the centers of the alignment marks 8 and 9 are located at accurately corresponding positions in the vertical direction, while reducing an adverse effect on the glass substrate 3.

Note that, if trepanning in which making a hole with a small diameter is repeated to form a hole with a large diameter is applied as a method of irradiation of the UV laser beam in the above embodiment, the diameter of each of the alignment marks 8 and 9 can be increased.

Next, a second embodiment in which a cutting mark used for cutting and dividing a substrate into a plurality of smaller rectangular substrates is formed in a resin layer provided on each of front and back surfaces of a glass substrate by use of a laser beam will be described. This cutting mark is formed by removing the resin layer corresponding to a portion to be cut for the purpose of preventing the resin layer from sticking to a blade of a cutting machine and affecting the cutting performance.

Figure 4A:
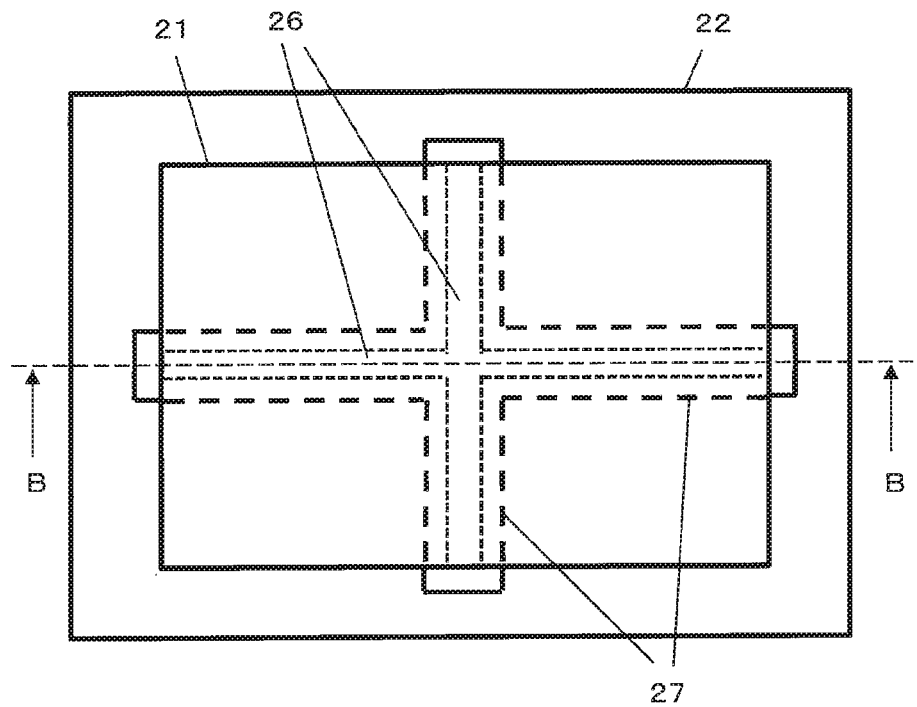
FIG. 4A is a plan view of the workpiece before the workpiece is processed according to the second embodiment of the present invention.
Figure 4B:
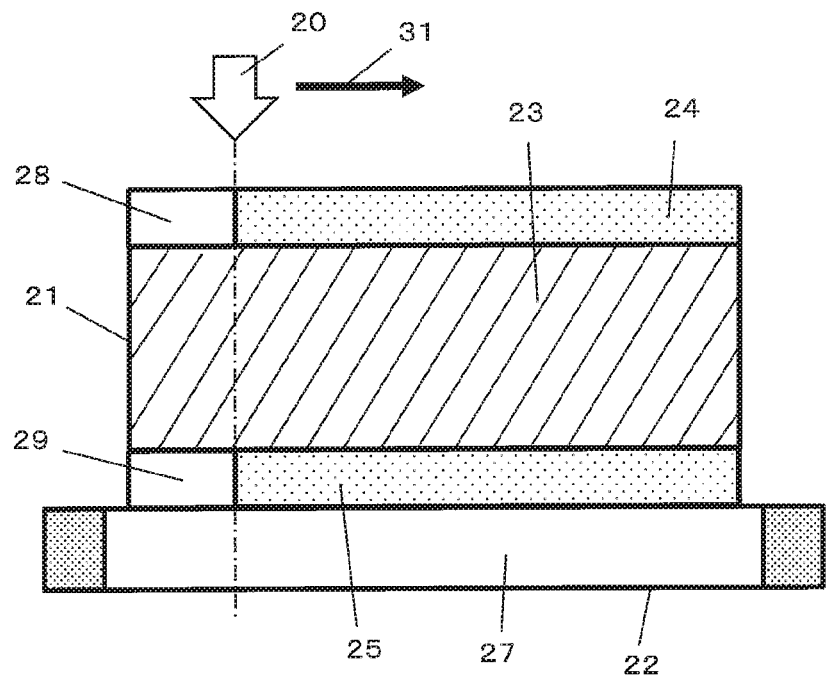
FIG. 4B is a cross-sectional view taken along a line B-B of FIG. 4A in the course of processing.

FIGS. 4A and 4B are views for describing the second embodiment of the present invention. FIG. 4A is a plan view of a workpiece before the workpiece is processed, and FIG. 4B is a cross-sectional view taken along a line B-B of FIG. 4A in the course of processing. In FIGS. 4A and 4B, reference numeral 21 is a substrate serving as a workpiece, reference numeral 22 is a table for placing the substrate 21, reference numeral 23 is a glass substrate serving as a constituent material of the substrate 21, reference numeral 24 is a resin sheet attached to a front surface of the glass substrate 23, and reference numeral 25 is a resin sheet attached to a back surface of the glass substrate 23. In this case, the resin layer may be provided by another method such as coating, instead of attaching the resin sheets 24 and 25. Reference numeral 26 denotes a cutting mark forming position to be formed on the resin sheet 24. A laser hole 27 having an area larger than that of the cutting mark to be formed is provided at a position in the table 22 corresponding to the cutting mark forming position 26, in order to prevent irradiation of the laser beam on the table 22.

Note that, although the cutting mark in this embodiment has a cross shape in order to divide the substrate 21 into four pieces of smaller rectangular substrates, other shapes may be applicable.

In a state in FIGS. 4A and 4B, the table 22 is relatively moved such that the UV laser beam moves in a direction of an arrow 31, while irradiating the cutting mark forming position 26 with a UV laser beam from top as indicated by an arrow 20. This UV laser beam has an energy density of, for example, 20 mJ/mm$^2$, which is an energy capable of processing a resin but incapable of processing a glass, similarly to the first embodiment.

Figure 3:
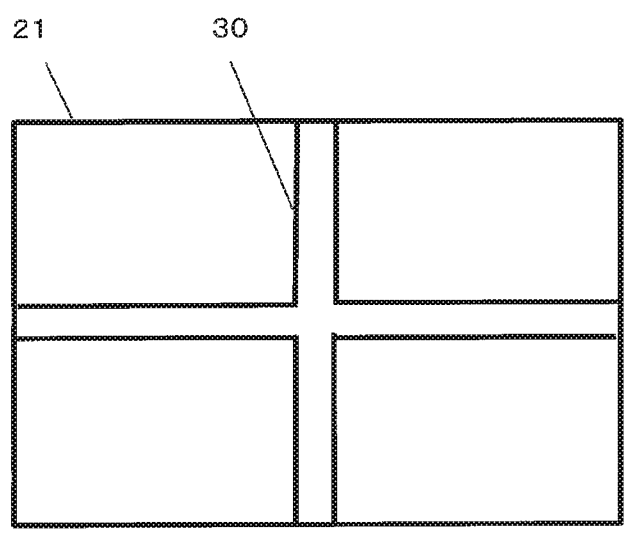
FIG. 3 is a plan view illustrating a state after a workpiece is processed according to a second embodiment of the present invention.

The UV laser beam passing through the resin sheet 24 on the front surface passes through the glass substrate 23 without damaging the glass substrate 23 and reaches the resin sheet 25 on the back surface. Accordingly, respective portions 28 and 29 of the resin sheets 24 and 25 are removed after the UV laser beam passes, and after this processing, the substrate 21 in which respective trenches 28 and 29 are formed at the cutting mark forming position 26 in the resin sheets 24 and 25 is completed. On a front surface side of the substrate 21 illustrated in FIG. 3, reference numeral 30 denotes a cutting mark by the trench 28, and another cutting mark by the trench 29 is also formed at the corresponding position on a back surface side.

In this case, even if a width of the trench 29 of the cutting mark on aside of the resin sheet 25 is a little smaller than a width of the trench 28 of the cutting mark 30 on a side of the resin sheet 24 due to laser processing characteristics, as long as allowance is provided for a width of the trench in consideration of a width of a blade of a cutting machine, there is no inconvenience as a cutting mark because a center of the trench 28 and a center of the trench 29 are located at corresponding positions in a vertical direction.

According to the second embodiment described above, it is possible to simultaneously form the respective cutting marks in the resin sheets 24 and 25, respectively, such that the centers of the cutting marks in the resin sheets 24 and 25 are located at accurately corresponding positions in the vertical direction, while reducing an adverse effect on the glass substrate 23.

In the foregoing, embodiments in which each of an alignment mark and a cutting mark is formed in the resin layer provided on each of the front and back surfaces of the glass substrate by use of the laser beam have been described. However, it is obvious that the present invention is applicable also to a case in which other marks are formed in the resin layer provided on each of the front and back surfaces of the glass substrate.

What is claimed is:

1. A substrate processing method in which, for a substrate including a first layer made of a glass substrate and second layers made of a material different from that of the first layer and provided on a front surface and a back surface of the first layer, respectively, an intended mark is formed in each of the second layers, the substrate processing method comprising the step of:

irradiating with a laser beam having an energy density capable of processing the second layers but incapable of processing the first layer from one surface side of the substrate, thereby simultaneously forming the mark at corresponding positions on each of a front surface and a back surface of the substrate.

2. The substrate processing method according to claim 1, wherein the mark is an alignment mark used for positioning in processing the substrate.

3. The substrate processing method according to claim 2, wherein the irradiation of the laser beam is performed by trepanning.

4. The substrate processing method according to claim 1, wherein the mark is a cutting mark used in cutting the substrate.

* * * * *